April 17, 1945.     J. FERLA     2,373,672
APPARATUS FOR MANUFACTURING PIPES OF COMPOSITION MATERIAL
Filed June 6, 1938     3 Sheets-Sheet 1
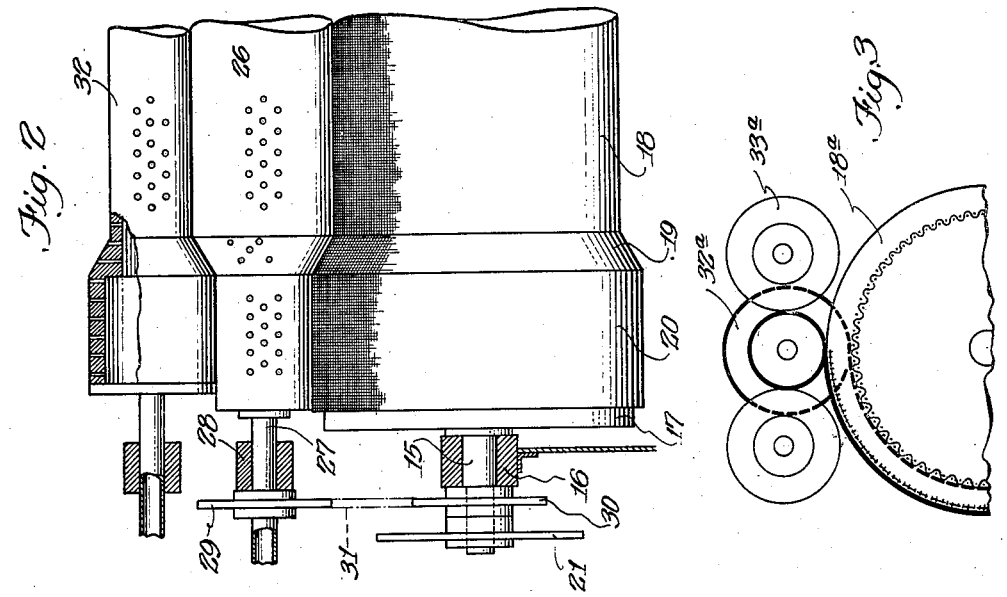
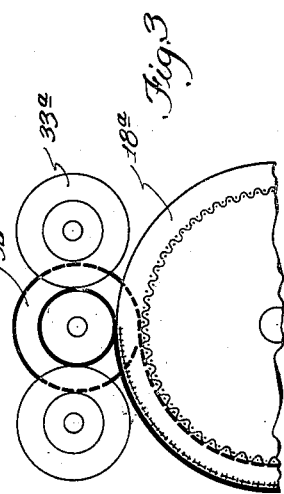
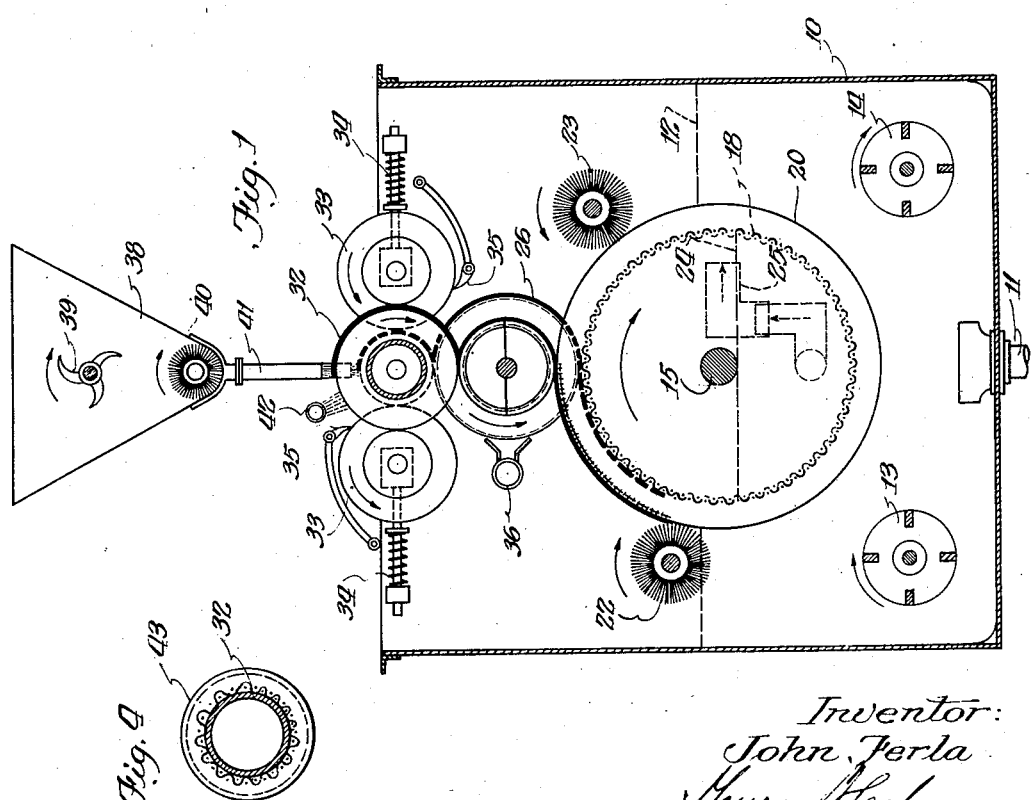
Inventor:
John Ferla
By: Henry Meeh
Attorney.

April 17, 1945. J. FERLA 2,373,672
APPARATUS FOR MANUFACTURING PIPES OF COMPOSITION MATERIAL
Filed June 6, 1938 3 Sheets-Sheet 2
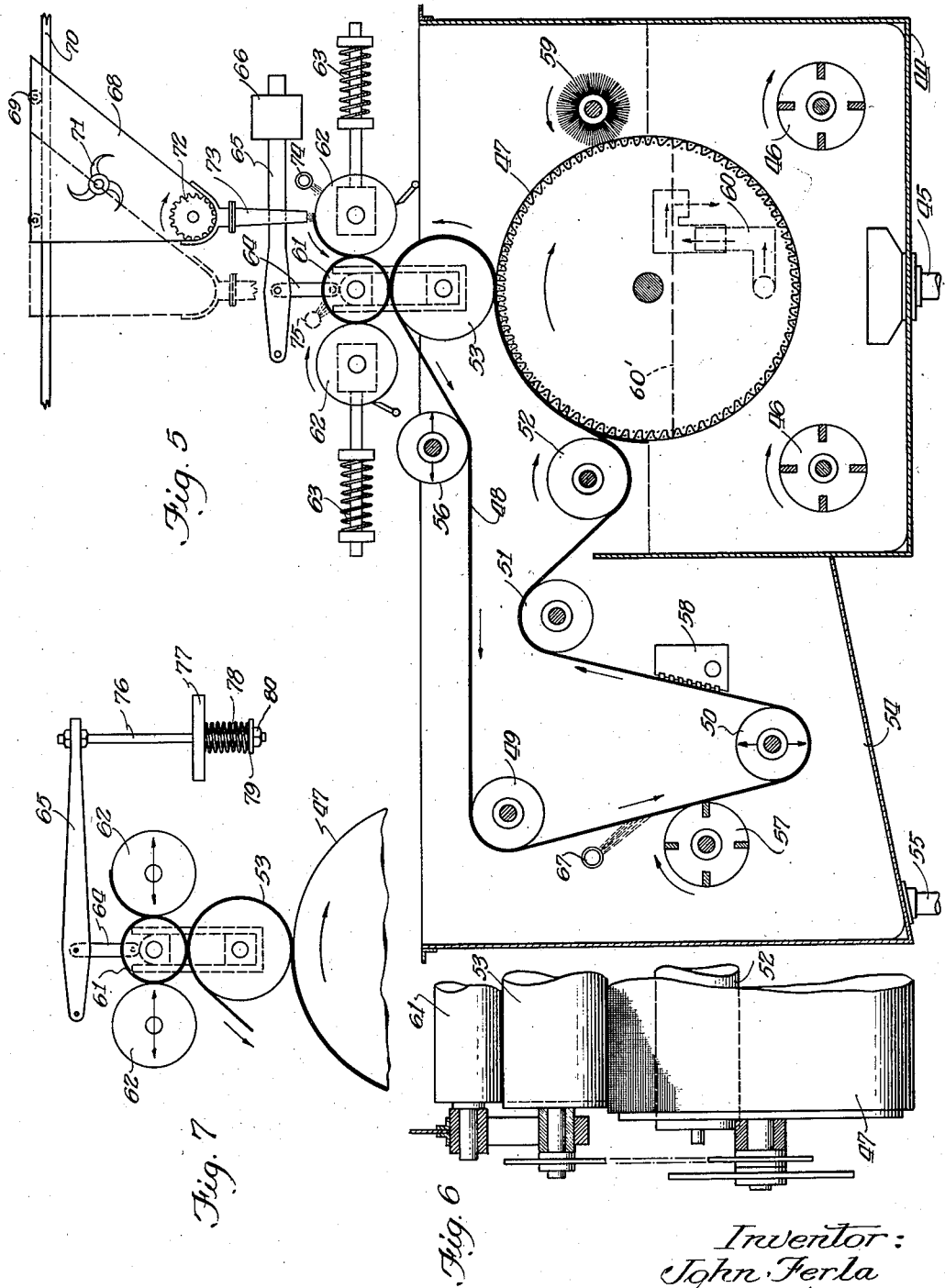
Inventor:
John Ferla
By: *[signature]*
Attorney.

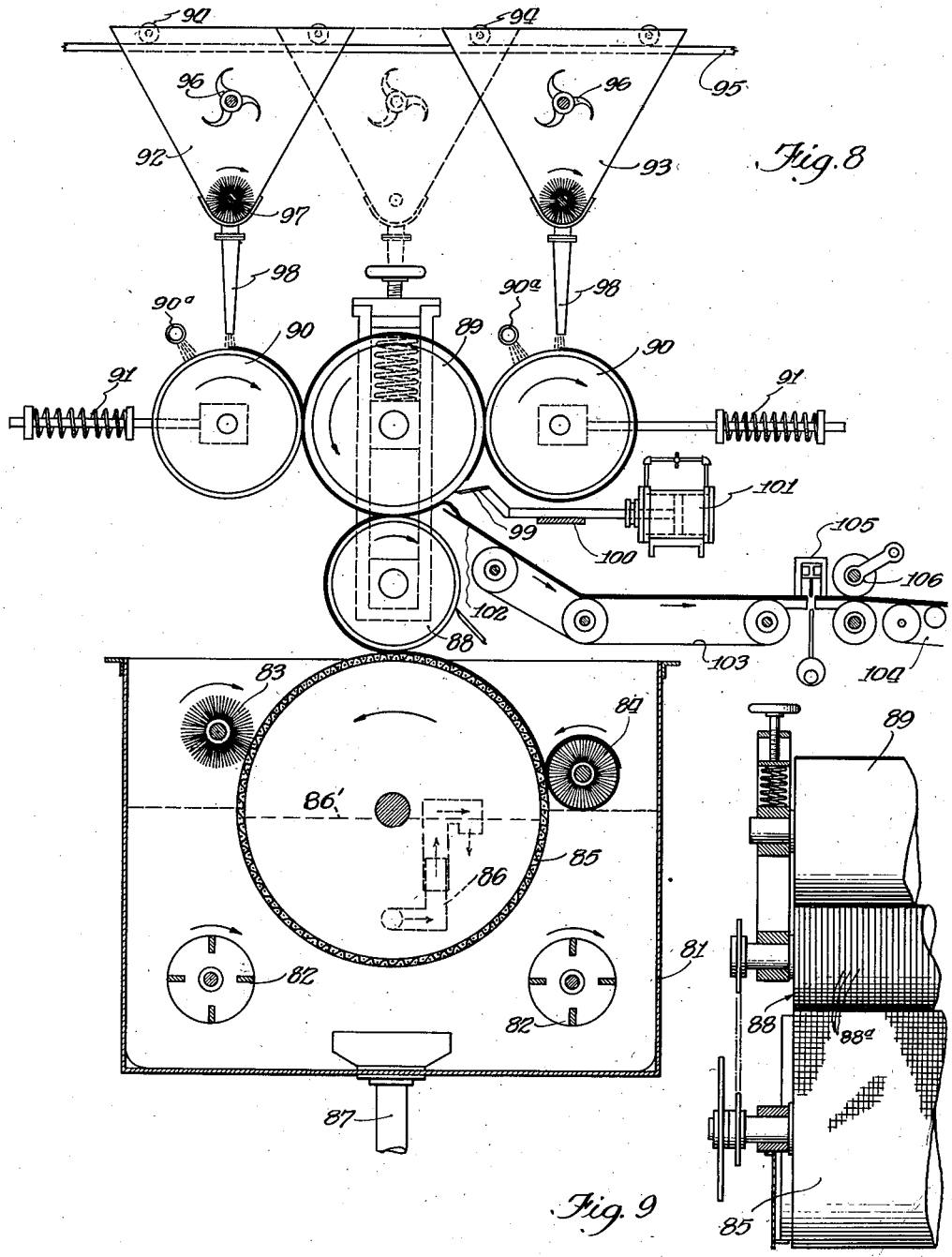

Patented Apr. 17, 1945

2,373,672

UNITED STATES PATENT OFFICE 2,373,672

APPARATUS FOR MANUFACTURING PIPES OF COMPOSITION MATERIAL

John Ferla, Chicago, Ill., assignor of one-fourth to Paul X. Blaettler, Oaklyn, N. J., and three-fourths to U. S. Asbestos Cement Pipe Company, Camden, N. J., a corporation of New Jersey Application June 6, 1938, Serial No. 212,070

5 Claims. (Cl. 92—66)

The invention relates to the art of manufacturing tubes from a composition material, such as asbestos and cement, as described in my Patent #2,177,643.

In my previous application, I have evolved the method of forming tubes with or without bell collars, by imparting to the mandrel a layer of wet composition material, and thereafter superposing thereon, under pressure, semi-dry layers.

The present invention has, for its objects, certain modifications and improvements to enhance the utility and efficiency of the novel semi-dry process, and the apparatus employed for carrying out the same.

With these and other equally important objects in view, which will become apparent from a perusal of the invention, the latter comprises the steps of a novel method and means for carrying out the same, described in the following specification, particularly pointed out in the claims forming a part thereof, and illustrated in the accompanying more or less diagrammatic drawings, in which:

Fig. 1 is a sectional elevation of an apparatus constructed in accordance with my invention.

Fig. 2 is a side view of the rotary parts.

Fig. 3 is a diagrammatic view of a modification.

Fig. 4 is a cross section of a roller.

Fig. 5 is a sectional elevation of a modified apparatus.

Fig. 6 is a fragmentary side view of the fabric belt and rollers.

Fig. 7 is a slight modification of the pressure means for the mandrel.

Fig. 8 is a sectional elevation of an apparatus for producing sheeting; and

Fig. 9 is a fragmentary section through the molding screen and accumulating roller.

Referring to Figs. 1 and 2, 10 designates a vat, into which leads a feed pipe 11, supplying a liquid containing a composition material in suspension, which is maintained at a level 12.

Near the bottom, agitators 13 and 14 keep the mixture in agitation and maintain uniform consistency.

A horizontal shaft 15 is journaled in bearings 16, provided on the outside of the vat and carries a frame 17, on which is mounted a cylindrical molding screen 18 having, at one end, a frustoconical portion 19 which merges into a cylindrical terminal portion 20, of larger diameter than the body portion 18.

The shaft is provided with a pulley 21, to which driving power is imparted in any appropriate or conventional manner.

A spreading roller 22 cooperates with the molding screen to form a layer on the screen, while a cleaning roller 23 removes adhering particles before the screen portion, on which the layer has been formed, reenters the liquid bath in vat 10.

In the rotation of the molding screen, the liquid filters through the screen openings and accumulates to a level 24, which is determined by a telescopic pipe 25 which may be adjusted to vary the level 24.

A perforated hollow roller 26 is mounted on a shaft 27, journaled in bearings 28, and of a configuration to contact the molding screen. The interior of roller 26 is constructed as a suction commutator so that, during part of a revolution, a vacuum is set up which ceases during the remaining part of the revolution.

The shaft 27 has a pulley 29 in registry with a pulley 30 on the shaft 15 and a belt 31 is trained around said pulleys. A mandrel 32 is superposed on the roller 26, and calender rollers 33 cooperate with said mandrel, whose interior is under vacuum.

The calender rollers are maintained by springs 34 under resilient pressure to contact with the mandrel. Blades 35 engage the surface of the calenders, to prevent any material from adhering thereto after deposit onto the mandrel.

In the event the roller 26 has no vacuum and is covered with fabric, a vacuum suction device 36 is provided, acting on the surface of the roller 26 to absorb the humidity of the fabric to qualify the latter for picking up the wet layer from the molding screen.

A hopper 38 is supported above the vat and contains dry material which is mixed by an agitator 39 therein and discharged by a feeding roll 40 through a tube 41 onto the mandrel.

If desired, a water pipe 42 may discharge atomized water onto the calender, so as to cause adherence of the dry material issuing from the tube 41 to the wet layer on the mandrel.

In operation, the liquid containing the composition material in suspension deposits a layer of wet material, determined by the difference of the liquid levels 12 and 24, onto the molding screen 18, whence it is removed by the roller 26, for deposit onto the mandrel 32 while simultaneously compacted by one of the calender rollers 33. A layer of semi-dry material is then superposed and compacted onto the wet layer by the other calender roller 33. Humidity is removed by the vacuum maintained in the interior of the mandrel.

The mandrel, in the event a vacuum is not desired, may be imperforate and covered by a layer of fabric 43 (Fig. 4) which may be a single layer or a tape helically wound around the mandrel.

The modification illustrated in Fig. 3 dispenses with the semi-dry layer in producing tubes, but relies solely on the superposition of wet layers. In this embodiment, the molding screen 18a is in directed contact with the mandrel 32a, with which cooperate the calender rollers 33a.

The modification shown in Fig. 5 includes a vat 44, to which the liquid containing the composition material in suspension is introduced by a pipe 45 and maintained at proper consistency by agitators 46.

A cylindrical molding screen 47 contacts with an endless conveyor 48 of fabric which is trained around rollers 49, 50, 51, 52 and 53, and a portion of the endless conveyor is arranged in a supplementary chamber 54 of the vat 44, which is provided with an outlet pipe 55.

The roller 50 is adjustable to constitute a take-up roller and an adjustable roller 56 contacts with the upper run of the conveyor.

Wipers 57 contact the conveyor at the left end of said conveyor, as viewed in Fig. 5, whereas a vacuum box 58 in the chamber 54 contacts with the rising portion of the conveyor.

A cleaning roller 59 acts on the molding screen 47, which has a telescopic pipe 60 in its interior to regulate the filtration through the molding screen, maintaining a liquid level therein at 60'.

The conveyor 48 engages only the underside of a mandrel or accumulating roller 61, so as to make it possible for the calender rollers 62 to cooperate with the mandrel.

The calender rollers are held under the influence of the springs 63 in resilient contact with the mandrel 61, which has a link 64, connected to a lever 65 provided with an adjustable counterweight 66, so as to vary the pressure of the mandrel on the endless conveyor.

Above the wipers 57, a spray pipe 67 is provided to direct a stream of water onto the conveyor. A hopper 68 is provided with wheels 69, adapted to run on rails 70, and the material therein is mixed by an agitator 71 and discharged by a feeding roll 72, through chutes 73, directly onto a calender roll or onto the mandrel, in accordance with the position occupied by the hopper.

A spray pipe 74 is adapted to discharge liquid onto the calender roll 62, to mix with the dry material issued from the chutes 73.

If desired, a spray pipe 75 may be provided to discharge liquid onto the mandrel 61.

The modification shown in Fig. 7 replaces the counterweight 66 by a rod 76, secured to the lever 65 and extending through a stationary plate 77. A spring 78 is interposed between the plate 77 and a washer 79, held on the rod by a nut 80.

In Figs. 8 and 9, an apparatus is depicted for manufacturing sheeting or slabs. Here again a vat 81 has agitators 82, a cleaning roll 83, a spreading roll 84, a molding screen 85, a telescopic pipe 86 therein maintaining a liquid level 86' in the molding screen 85, and a supply pipe 87.

The molding screen contacts with a superposed roller 88, whose interior is not under a vacuum, and contacts with an accumulating roller 89, with which cooperate calender rollers 90, held thereagainst by springs 91. A spray pipe 90a is adapted to discharge sprays of liquid onto the calender roller. The roller 88 may be provided with a grooved surface as at 88a.

Hoppers 92 and 93 are provided with rolls 94, which run on rails 95, for lateral shifting of the hoppers, which have agitators 96, feeding rolls 97, and discharge chutes 98.

A cutting blade 99 is reciprocably mounted in a guide 100 and actuated by a hydraulic motor 101. The blade, upon its forward thrust, cuts the layer on the accumulating roller 89 and the severed layer drops unto an apron 102, and thence reaches an endless conveyor 103, to be carried to another endless conveyor 104.

Between the conveyors 103 and 104, a shearing device 105 is provided to cut the boards or sheeting transversely into sections, whereas rotary cutters 106 cut the sections longitudinally to obtain boards of predetermined sizes.

While the drawings show preferred embodiments of the invention, numerous changes and alterations may be made without departing from the spirit of the invention.

I, therefore, do not limit myself to the details of construction and arrangements, as shown, but wish to include all modifications, changes and alterations which come within the scope of the invention, as defined in the appended claims.

I claim:

1. Apparatus for molding tubes having a bell end from a cementitious composition material, including a vat containing the material in suspension, a rotary screen in said vat filtering out the liquid from said material, a mandrel above said screen and in vertical registry therewith, means for transferring the wet layer adhering to said screen to said mandrel, and means for superposing on the wet layer adhering to said mandrel a layer of moist material and for applying pressure to said applied layers before the next succeeding layer is formed thereon.

2. Apparatus for molding tubes having a bell end from a fibrous cementitious composition material, including a vat containing the material in suspension, a rotary screen with a bell end in said vat filtering out the liquid from said material, a mandrel, means for transferring the wet layer adhering to said screen to said mandrel, said transferring means being maintained at a fixed distance from said screen, means for superposing on the wet layer adhering to said mandrel a layer of moist material, and means for compacting the layers on said mandrel before the next succeeding layer is applied to the mandrel.

3. Apparatus for molding tubes from a fibrous cementitious composition material, including a vat containing the material in suspension, a rotary screen with a bell end in said vat filtering out the liquid from said material, a mandrel above said screen and in vertical registry therewith, means for transferring the wet layer adhering to said screen to said mandrel, said transferring means being maintained at a fixed distance from said screen, and means for directly superposing on the wet layer adhering to said mandrel a layer of moist material and for applying pressure to said applied layers before the next succeeding layer is formed thereon.

4. Apparatus for molding tubes from a cementitious composition material, including a vat containing the material in liquid suspension, a rotary screen in said vat filtering out the liquid from said material, a mandrel above said screen, means for transferring the wet layer adhering to said screen to said mandrel, means for superposing on the wet layer adhering to said mandrel a layer of moist material, and calender rollers cooperating with said mandrel for compacting the layers thereon before the next succeeding layer is applied to the mandrel.

5. Apparatus for molding tubes from a cementitious composition material, including a vat containing the material in suspension, a rotary screen in said vat filtering out the liquid from said material, a mandrel above said screen and in vertical registry therewith, means for transferring the wet layer adhering to said screen to said mandrel, a hopper adapted to discharge dry material, calender rollers cooperating with said mandrel, and means for causing said hopper to discharge onto said mandrel.

JOHN FERLA.